United States Patent
Kawakami et al.

(10) Patent No.: US 7,478,133 B2
(45) Date of Patent: Jan. 13, 2009

(54) ORDERING SYSTEM, INFORMATION PROCESSING DEVICE, ORDERING METHOD, AND PROGRAM

(75) Inventors: Shuuhei Kawakami, Kanagawa (JP); Toru Kimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 676 days.

(21) Appl. No.: 10/950,947

(22) Filed: Sep. 27, 2004

(65) Prior Publication Data
US 2005/0105126 A1 May 19, 2005

(30) Foreign Application Priority Data
Sep. 30, 2003 (JP) ............................. 2003-341908
Sep. 9, 2004 (JP) ............................. 2004-262438

(51) Int. Cl.
G06F 15/16 (2006.01)
(52) U.S. Cl. ...................................................... 709/206
(58) Field of Classification Search ................. 709/206; 705/26
See application file for complete search history.

(56) References Cited
U.S. PATENT DOCUMENTS

| | | | | |
|---|---|---|---|---|
| 5,930,810 A | * | 7/1999 | Farros et al. ............... 715/201 |
| 6,330,068 B1 | * | 12/2001 | Matsuyama ................. 358/1.14 |
| 6,717,686 B1 | * | 4/2004 | Farros et al. .................. 358/1.1 |
| 7,222,087 B1 | * | 5/2007 | Bezos et al. .................... 705/26 |
| 2002/0113989 A1 | * | 8/2002 | Ferlitsch et al. ............. 358/1.15 |
| 2002/0126149 A1 | * | 9/2002 | Umeda ........................ 345/769 |
| 2002/0191208 A1 | * | 12/2002 | Uemura et al. .............. 358/1.14 |
| 2003/0182204 A1 | * | 9/2003 | Rhee ............................ 705/26 |

* cited by examiner

*Primary Examiner*—Jason D Cardone
*Assistant Examiner*—Minh-Chau Nguyen
(74) *Attorney, Agent, or Firm*—Canon U.S.A. Inc., I.P. Division

(57) ABSTRACT

An ordering system has a server device and client device communicably connected via a network, with the server receiving orders from the client device. The server device comprises a receiving unit for receiving the order information from the client device and writing to memory, an order model managing unit for managing order information as an order model, and a sending unit for automatically sending the order model managed by the order model managing unit to the client device. The client device comprises a receiving unit for receiving the order model, an order model saving unit for saving the order model, an order information editing unit for editing the order information written to the order model saved at the order model saving unit, and a sending unit for sending the order model with order information edited by the order information editing unit to the server device.

10 Claims, 17 Drawing Sheets

FIG. 3A

| DELIVERY ADDRESS INFORMATION ID | DELIVERY METHOD | ADDRESSEE | ADDRESS |
|---|---|---|---|
| 0001 | POSTAL MAIL | CANON | 3-30-2, SHIMOMARUKO, OHTA-KU, TOKYO |

FIG. 3B

| PRINTING SETTING INFORMATION ID | NUMBER OF COPIES | COLOR | SIZE | PAPER TYPE | TWO-SIDED | FINISHING |
|---|---|---|---|---|---|---|
| 0001 | 10 | 1 | A4 | COLOR PAPER | 1 | STAPLING |
| 0002 | 50 | 0 | A3 | REGULAR PAPER | 0 | NONE |

FIG. 3C

| PRINTING DOCUMENT INFORMATION ID | FILE NAME | FILE PATH |
|---|---|---|
| 0001 | test.pdf | C:\Tmp\ |

FIG. 4

| SETTING ITEM INFORMATION ID | VERSION ID | SETTING INFORMATION NAME | DELIVERY ADDRESS INFORMATION ID | PRINTING SETTING INFORMATION ID | PRINTING DOCUMENT INFORMATION ID |
|---|---|---|---|---|---|
| 0001 | 0001 | PRINTER MANUAL ORDER | 0001 | 0001 | 0001 |
| 0002 | 0001 | FLIERS | 0000 | 0002 | 0001 |

419 420 421 422 423 424

404

1001

ORDERING SYSTEM, INFORMATION PROCESSING DEVICE, ORDERING METHOD, AND PROGRAM

This application claims priority from Japanese Patent Application Nos. 2003-341908 filed Sep. 30, 2003 and 2004-262438 filed Sep. 9, 2004, which are hereby incorporated by reference herein.

BACKGROUND OF THE INVENTION

1. Field of the Invention

The present invention relates to an ordering system and an information processing device, an ordering method, and a program to be used therein, wherein a server device and a client device are connected via a network so as to be capable of communication, and the server device accepts orders from the client device.

2. Description of the Related Art

There are services wherein the printing of documents and images created by a user client is requested to a printing company via the Internet. In general, the user client accesses the Internet using a browser, uploads the documents and images desired to be printed to the server prepared by the printing company, inputs multiple items of information such as printing settings and delivery addresses, and requests the printing to the printing company.

With the conventional art, problems have occurred wherein access to the server of the printing company is disconnected due to of a network error or a user error during the user client inputting the information of multiple items such as printing settings and delivery addresses. Further, in such a case, the user had to access the server of the printing company, and to input information again in the multiple items such as printing settings and delivery addresses, which has been troublesome.

Further, in the case of performing multiple orders simultaneously, often the content to be input for one item is different and the remaining information is identical. However, in this type of case also, the user client had to repeatedly input the same information for each order.

Further, in order for the printing company server to save the input order information, a storage device or a storage medium had to be installed and maintained, which is a burden.

SUMMARY OF THE INVENTION

The present invention reduces the burden of the user re-inputting the order information when the access with the printing company is disconnected during the client user inputting of the order information to request printing of a document to the printing company.

Further, the present invention reduces the additional effort of the user for inputting the order information when the user client requests multiple printing orders.

According to an aspect of the present invention, a server device connectable to a client device via a network for communicating with the client device to receive orders from the client device, the server device comprises: a memory for storing order information; a receiving unit for receiving the order information from the client device and writing the order information to memory; an order model managing unit for managing the order information as an order model; and a sending unit for automatically sending the order model that is managed by the order model managing unit to the client device.

According to another aspect of the present invention, a client device connectable to a server device via a network for communicating with the server device for sending orders to the server device, the client device comprises: an order information sending unit for sending the order information to the server device; a receiving unit for receiving the order model including the order information from the server device; an order model saving unit for saving the order model received from the server device by the receiving unit; an order information editing unit for editing the order information of the order model saved by the order model saving unit; and an order model sending unit for sending the order model edited by the order information editing unit to the server device.

According to another aspect of the present invention, an ordering method wherein a server device and client device are connected via a network so as to be capable of communicating for the server to receives orders from the client device, the server device comprises: receiving order information from the client device; writing the order information to memory; managing the order information as an order model; and automatically sending the order model to the client device. A computer-readable medium may include instructions executable by the server device for performing the above-described method.

According to another aspect of the present invention, an ordering method wherein a client device and server device are connected via a network so as to be capable of communicating for the client device to send orders to the server device; the client device comprises: sending order information to the server device; receiving an order model including the order information from the server device, saving the order model in a storage device; editing the order information of the order model saved in the storage device; and sending the order model with the edited order information to the server device. A computer-readable medium may include instructions executable by the client device for performing the above-described method.

Other features and advantages of the present invention will be apparent form the following description of the embodiments taken in conjunction with the accompanying drawings, in which like reference characters designate the same or similar parts throughout the figures thereof.

BRIEF DESCRIPTION OF THE DRAWINGS

FIG. 4 is a diagram illustrating the configuration of setting item information according to the present invention.

DESCRIPTION OF THE EMBODIMENTS

First Embodiment

An embodiment of the present invention will be described below with reference to the drawings.

With the network printing service system according to the present embodiment, a user places an order via a network to a printing service server for the printing of a document that is stored on the printing service server, as described in detail below.

First, the user starts the browser on a client terminal and accesses the printing service server and displays an order information input screen. Next, the user inputs the necessary items for the printing order according to the order information input screen. The order information input screen is formed from multiple screens divided into several items. For example, printing setting item input screens for inputting the documents to be printed, the number of copies or the size of the printing sheets and so forth, delivery address item input screens for inputting the delivery address or addressee name receiving the printed articles, and so forth. Next, after the user ends the inputting of the items on each displayed order information input screen, the user depresses a next screen advance button or the previous screen advance button to display the order information input screen for inputting the next item, and inputs the next item. Next, the printing service server acquires the content of the items input by the user, and performs the printing processing.

Also, in particular, according to the present invention, when the user depresses the next screen advance button or the previous screen advance button on each order information input screen on the client terminal, and requests the display of an order information input screen for inputting a new item, the server of the printing company replies to this request, and creates an order information template from the content of the items input on the currently displayed information input screen, and sends this to the client terminal. Further, the server also creates setting item information for managing the versions of the items in the order information template and the order information input screens, and sends this to the client terminal. The client terminal saves the sent order information template and setting item information in memory, and uses it the next time a printing order is input.

Overall Configuration of Network Print System

Figure 1:
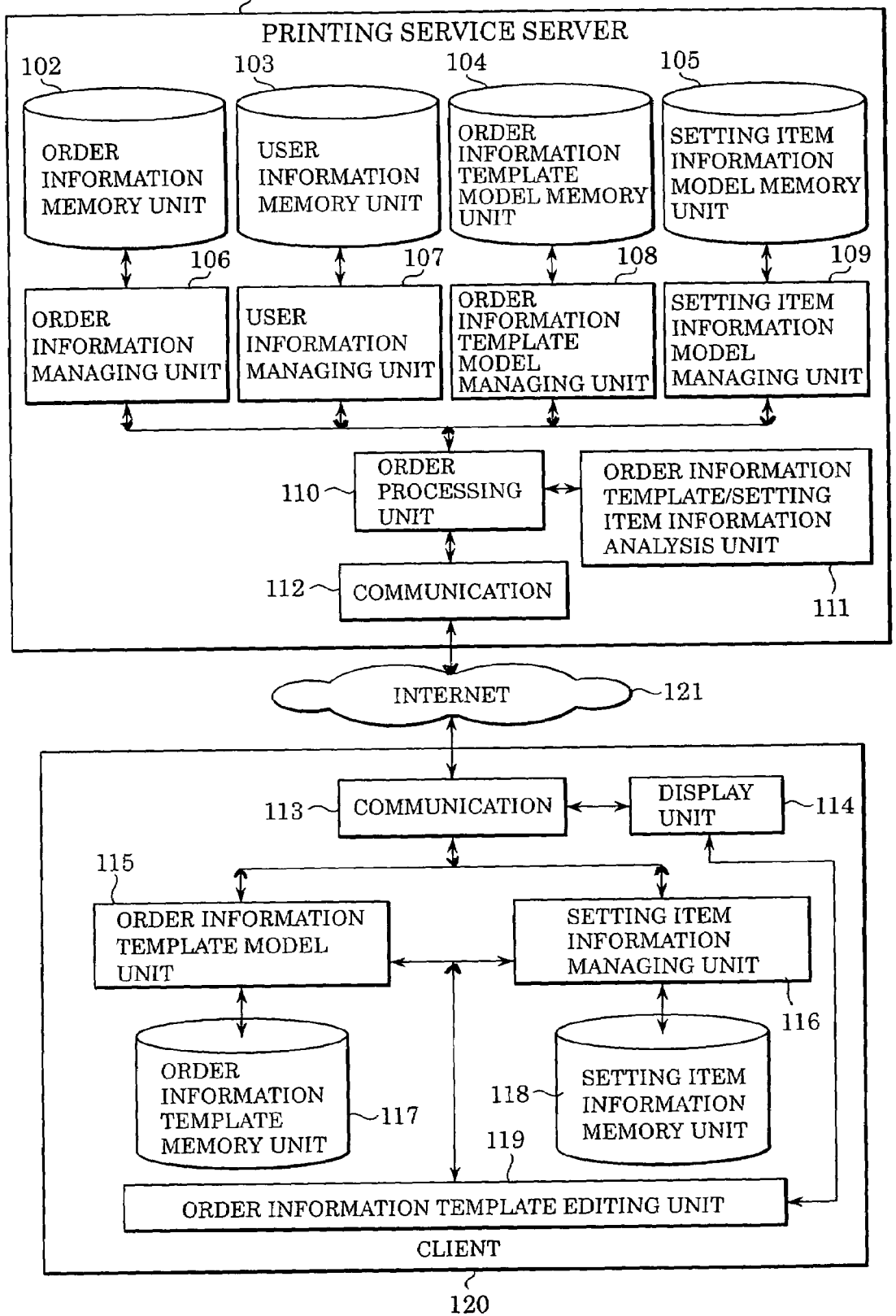
FIG. 1 is a diagram illustrating the configuration of a network printing service system according to the present invention.

First, the configuration of a network printing system relating to the present embodiment will be described below with reference to FIG. 1. As FIG. 1 illustrates, the network printing system comprises a printing service server 101 for providing a document printing service, an Internet 121, and a client 120 for ordering the document printing to the printing service server 101. FIG. 1 illustrates only one client 120, but multiples may exist. The client 120 and the printing service server 101 are capable of communicating via the Internet 121.

The printing service server 101 comprises an order information memory storage 102, a user information memory unit 103, an order information template model memory unit 104, a setting item information model memory unit 105, an order information managing unit 106, a user information managing unit 107, an order information template model managing unit 108, a setting item information model managing unit 109, an order processing unit 110, an order information template/setting item information analysis unit 111, and a communication unit 112.

The order information memory storage 102 is provided on an HDD 213 in FIG. 2 described later, and stores the order information including the number of copies to be printed and the size of the printing sheets, and the delivery addresses and addressee name for the printed articles, necessary for the printing processing and the delivery processing of the printed articles. The order information managing unit 106 manages the order information received from the order processing unit 110, and stores this in the order information memory storage 102.

The user information memory unit 103 saves the user information in memory, such as the user name and contact information of the client 120 that is requesting the document printing order. The user information managing unit 107 receives the user information from the order processing unit 110 and stores it in the user information memory unit 103, or replies to the requests from the order processing unit 110 and reads out the user information from the user information memory unit 103.

The order information template model memory unit 104 is provided within the HDD 213, and stores the order information template model to be used for creating an order information template that is saved on the client 120. The order information template model managing unit 108 manages the order information template model stored in the order information template model memory unit 104, extracts the order information template model from the order information template model memory unit 104, creates an order information template by inputting the order information received from the order processing unit 110, and sends this to the order processing unit 110.

The setting item information model memory unit 105 is provided within the HDD 213, and stores the setting item information model used in the case of creating the setting item information saved on the client 120. The setting item information model managing unit 109 manages the setting item information model and the version number thereof stored in the setting item information model memory unit 105. Further, the setting item information model managing unit 109 removes the setting item information model from the setting item information model memory unit 105, inputs the version and the setting item information received from the order processing unit 110, creates the setting item information, and sends this to the order processing unit 110. Further, the setting item information model managing unit 109 has a function to return the most recent version number of the setting item information based on the requests from the order processing unit 110.

The order processing unit 110 sends and receives various types of data between the order information managing unit 106, the user information managing unit 107, the order information template model managing unit 108, and the setting item information model managing unit 109, and performs order processing for the document printing.

Figure 11:
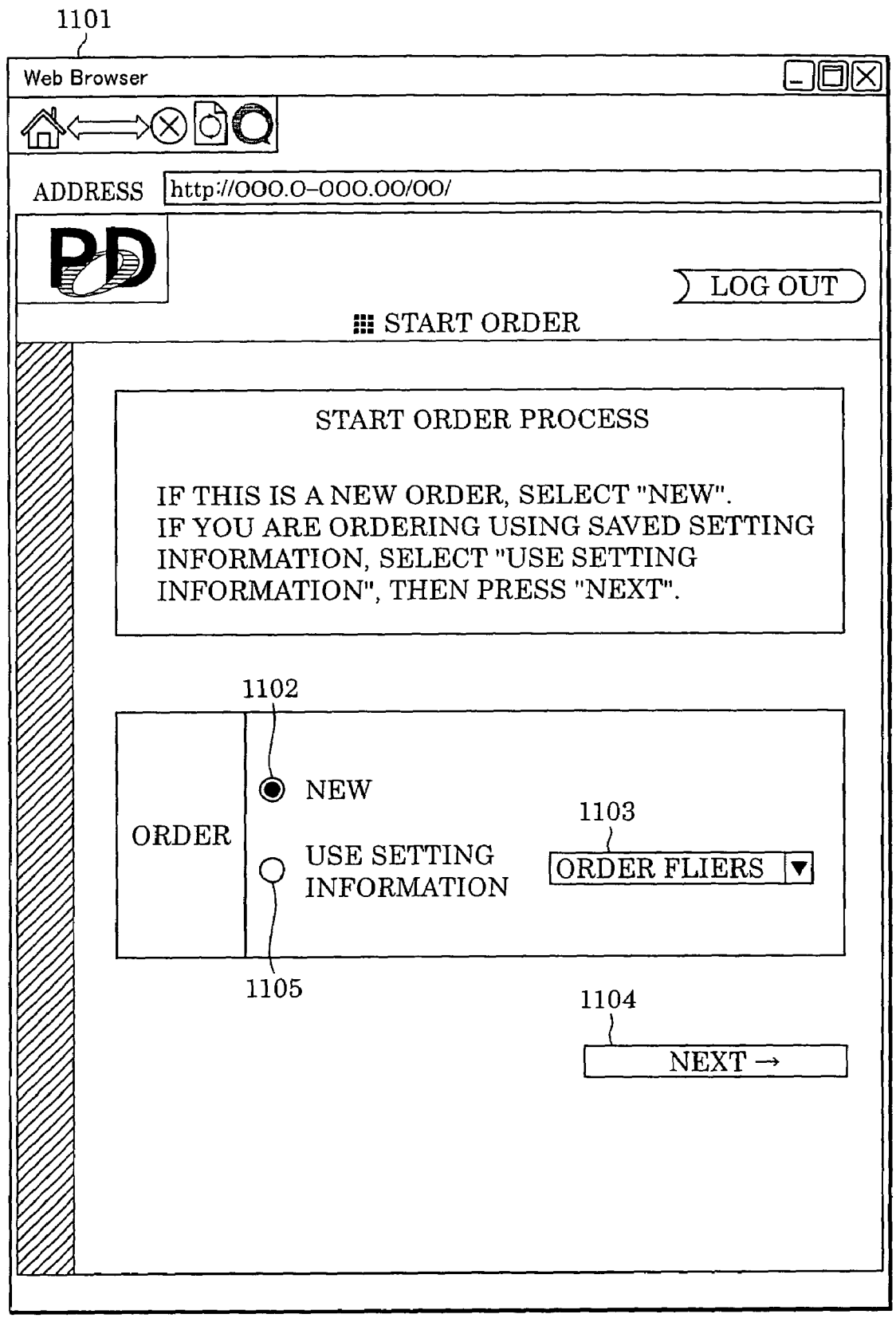
FIG. 11 is a diagram illustrating a printing order start screen according to the present invention.
Figure 12:
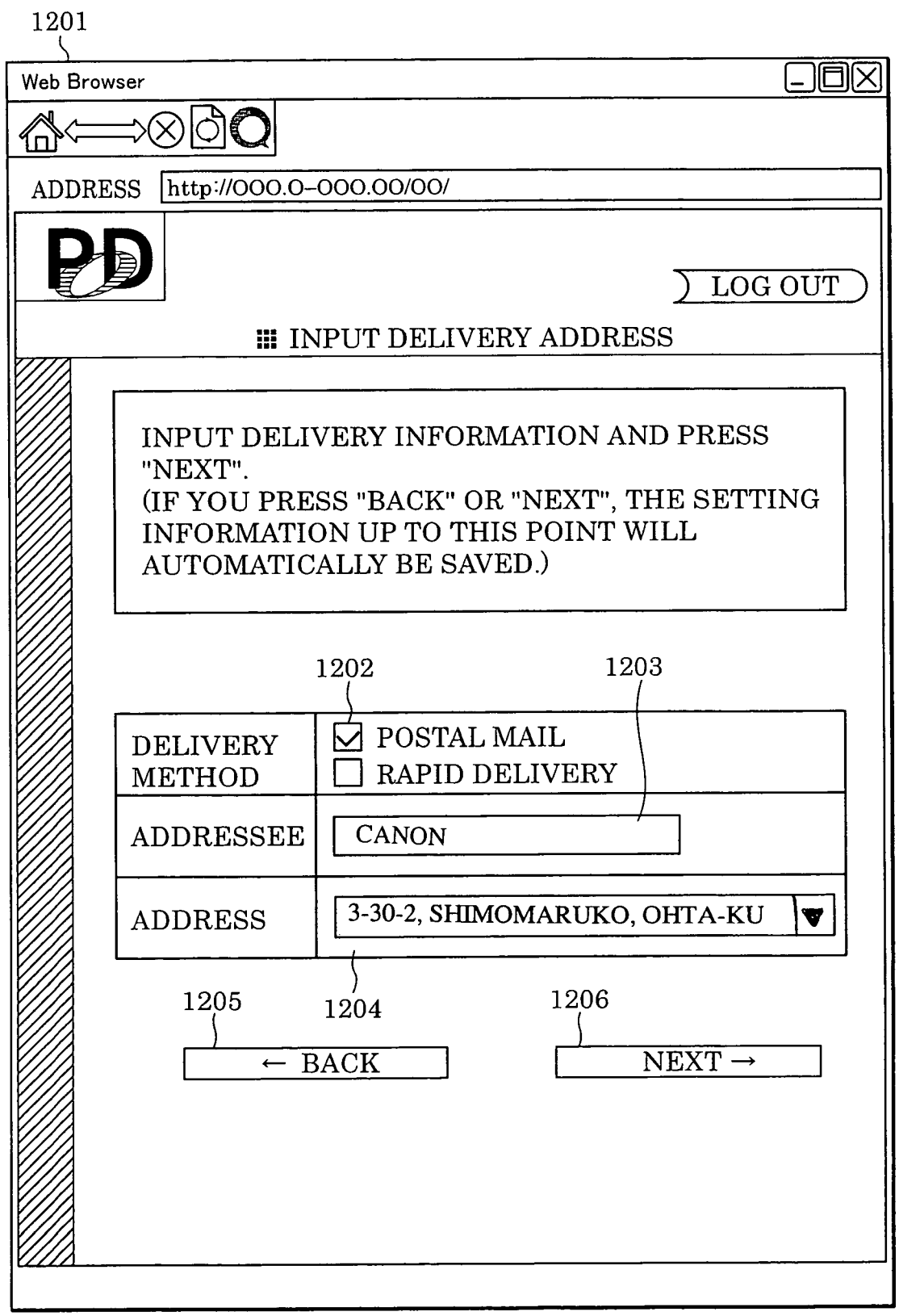
FIG. 12 is a diagram illustrating a delivery address item input screen according to the present invention.
Figure 13:
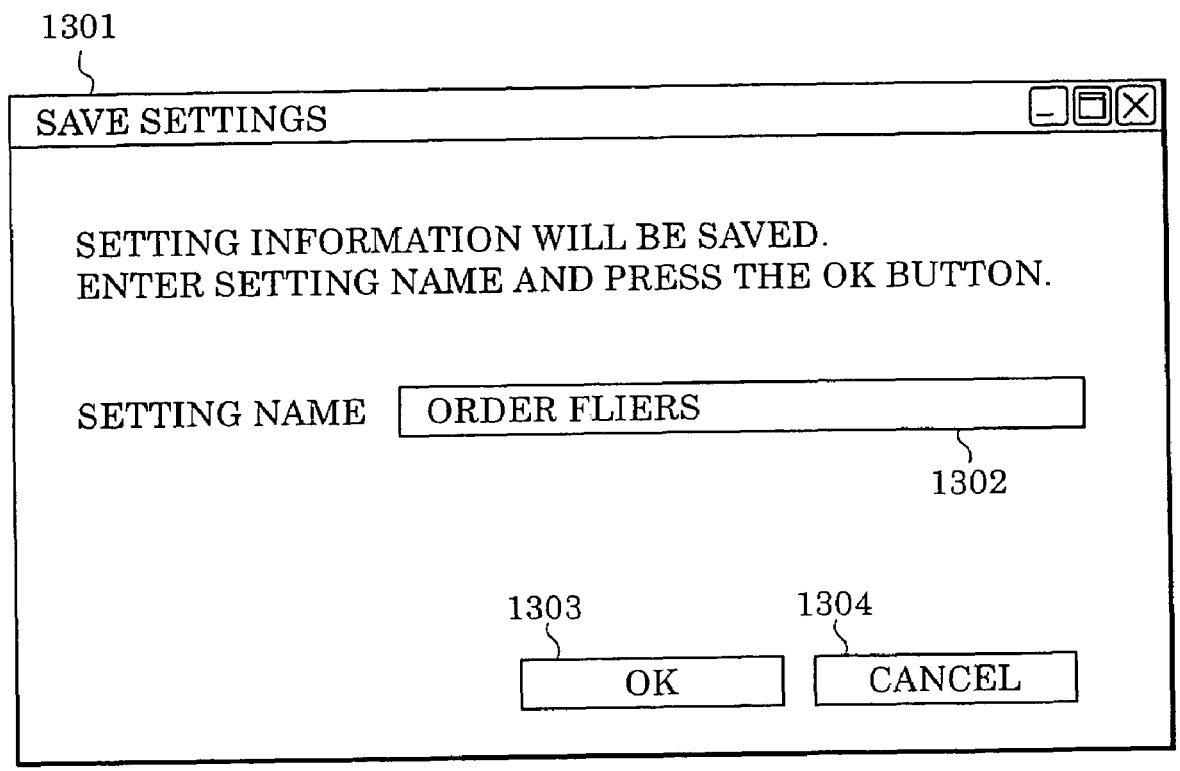
FIG. 13 is a diagram illustrating a setting item information name input screen according to the present invention.
Figure 14:
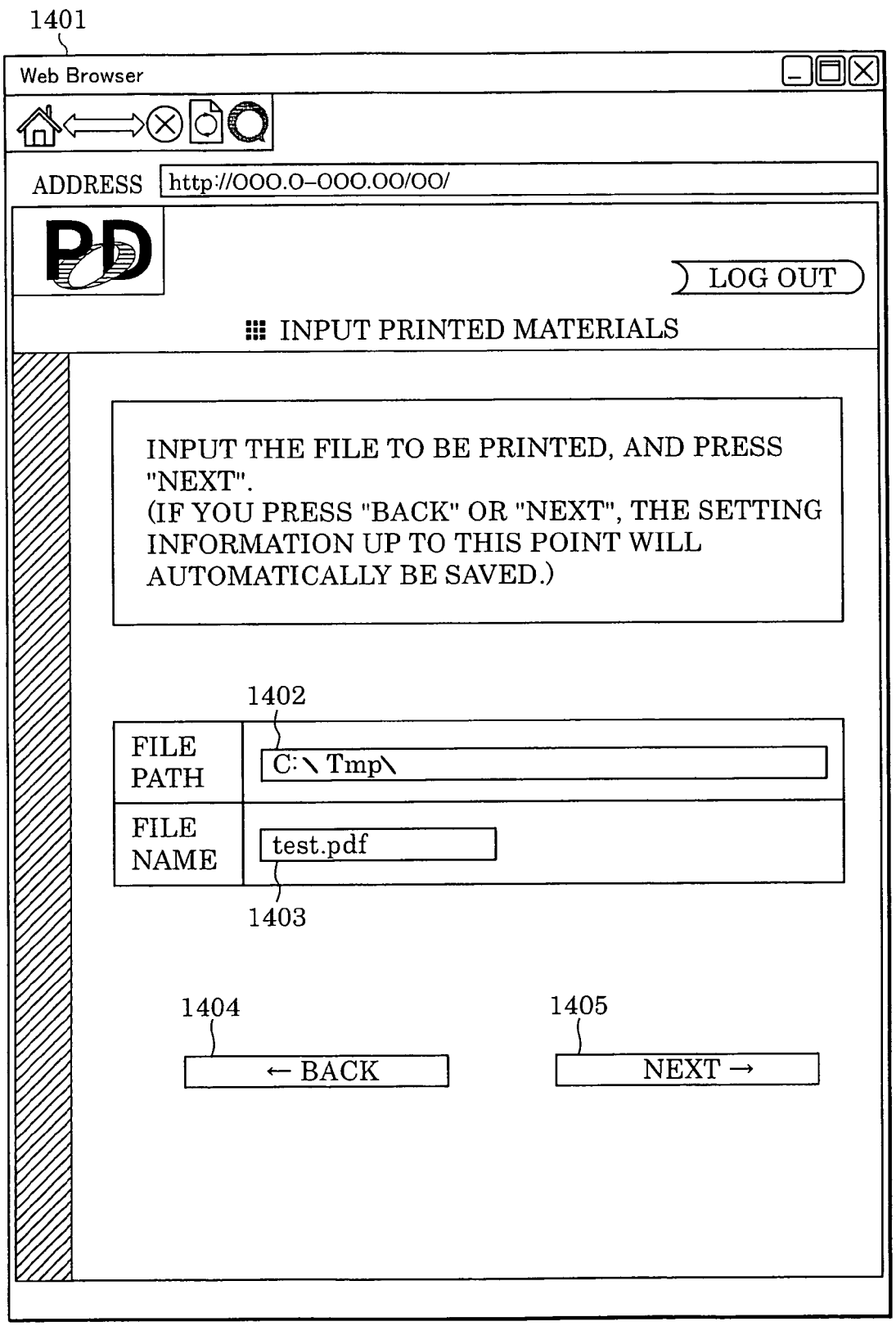
FIG. 14 is a diagram illustrating a printing document item input screen according to the present invention.
Figure 15:
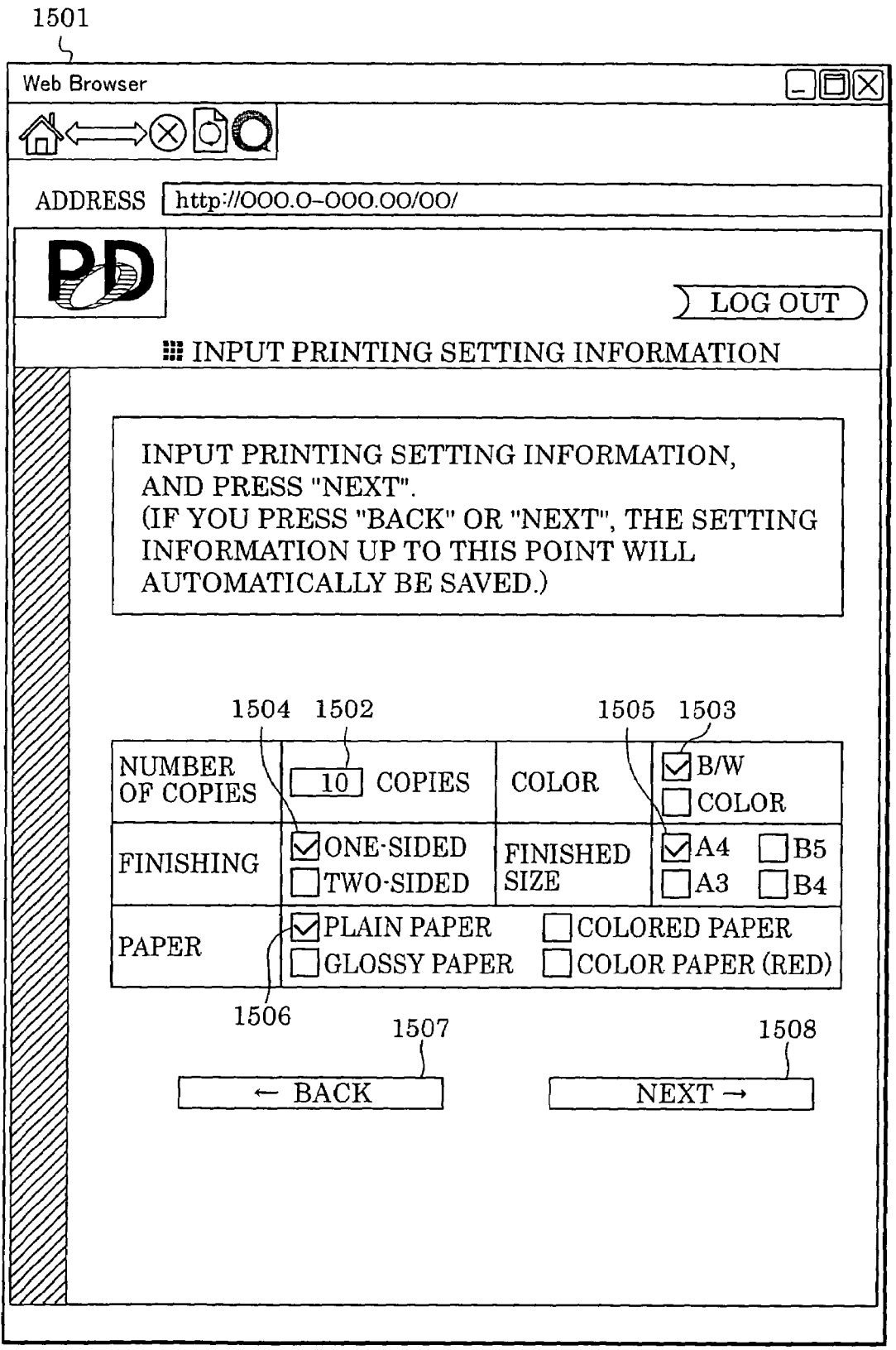
FIG. 15 is a diagram illustrating a printing setting item input screen according to the present invention.

Further, the order processing unit 110 sends the screen information for displaying each screen type such as a printing order start screen 1101 illustrated in FIG. 11, a delivery address item input screen 1201 illustrated in FIG. 12, a setting item information name input screen 1301 illustrated in FIG. 13, a printing document item input screen 1401 illustrated in FIG. 14, and a printing setting item input screen 1501 illustrated in FIG. 15, on the display unit 114 to the client 120 via the communication unit 113, using the browser of the client 120.

Further, the order processing unit 110 requests the order information template model managing unit 108 and the setting item information model managing unit 109 to create the order information template and the setting item information that is saved on the client 120. The communication unit 112 is then requested to send the created order information template and the setting item information to the client 120. Further, the order processing unit 110 requests the order information template/setting item information analysis unit 111 to analyze the order information template and the setting item information received from the client 120, and performs the order processing using the analysis results thereof.

The order information template/setting item information analysis unit 111 analyzes the content of the order information template and the setting item information received from the order processing unit 110, and returns the results of this analysis.

The communication unit 112 sends the order information template and the setting item information to a communication unit 113 of the client 120. Further, the order information template and the setting item information that is saved on the client 120 is received from the communication unit 113, and sends to the order processing unit 110.

The client 120 comprises the communication unit 113, a display unit 114, an order information template model managing unit 115, a setting item information managing unit 116, an order information template memory unit 117, a setting item information memory unit 118, and an order information template editing unit 119.

The communication unit 113 receives the order information template and the setting item information that is sent from the communication unit 112 of the printing service server 101, and sends this to the order information template model managing unit 115 and the setting item information managing unit 116. The display unit 114 receives the screen information of the printing service server 101 from the communication unit 113, and displays it on the CRT 209 of the client 120.

The order information template model managing unit 115 stores the order information template received from the printing service server 101 in the order information template memory unit 117. Further, in the case wherein the user re-inputs the order information, the order information template is read out from the order information template memory unit 117 and sent to the communication unit 113.

The setting item information managing unit 116 stores the setting item information from the printing service server 101 in the setting item information memory unit 118. Further, in a case wherein the user of the client 120 re-inputs the order information, the setting item information model managing unit 106 reads out the setting item information from the setting item information memory unit 118 and sends this to the communication unit 113.

Block Diagram of Printing Service Server

Next, the configuration of a computer device comprising the printing service server 101 and the client 120 will be described below with reference to FIG. 2.

Figure 2:
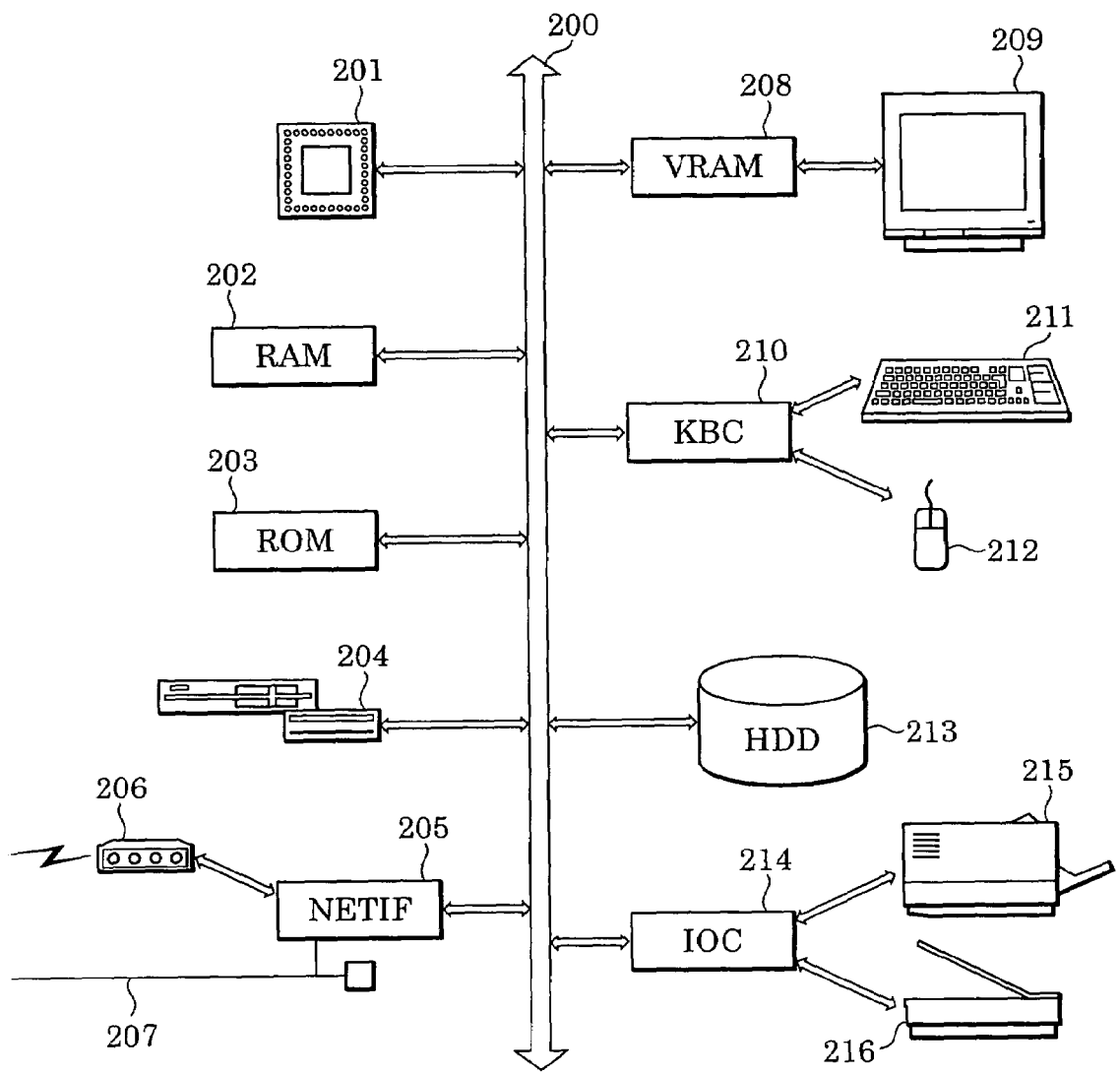
FIG. 2 is a diagram illustrating the configuration of a computer device making up a printing service server or a client according to the present invention.

The computer device, comprising the printing service server 101 and the client 120, comprises a CPU 201, RAM 202, ROM 203, an external storage medium read/write unit 204, a net interface 205, VRAM 208, a KBC 210, an HDD 213, an IOC 214, and a system bus 200 for connecting these units, as illustrated in FIG. 2. The system bus 200 is a transfer path for sending the data and control information between each of the above units.

The CPU 201 is a central processing unit for performing various controls and computations for the printing service server 101.

The RAM 202 is random access memory, and provides storage area for the execution program, and execution area and data storage area for this program, as the main memory of the CPU 201.

The ROM 203 is read-only memory that stores the operation processing procedures of the CPU 201, and stores a basic program (in general called BIOS) for performing control of each unit within the printing service server 101, and information necessary for operating the system.

An external storage medium read/write unit 204 is a group of units that performs data input/output of removable external storage medium, such as a floppy disk or CD-ROM.

A net interface 205 is a network interface, and connects to an external network via a modem 206, or connects to a LAN 207. The net interface 205 performs control for data transfer with other units including the client 120, and diagnoses connection status, using the Internet 121. The modem 206 comprises a terminal adapter (TA) and so forth for modem or ISDN connections, for connecting an external network and the printer service server 101 via a telephone line. The LAN 207 is a network system such as an Ethernet. According to the present embodiment, the printing service server 101 connects to the Internet 121 via the modem 206 or via communication equipment such as a router or gateway connected to the LAN 207.

The VRAM 208 is video RAM, which renders the image data for display on the CRT 209, and controls the display. Here, a liquid crystal display device or the like may be used in place of the CRT 209.

The KBC 210 is a controller that controls the input signals from a keyboard 211 and a pointing device 212.

An HDD 213 is a hard disk drive, and is used as memory to save application programs, various data, and so forth. An application program according to the present embodiment is a software program and so forth that executes various processing means.

The IOC 214 is for controlling a printer 215 and a scanner 216, and is capable of being connected to external devices other than the printer 215 and the scanner 216, for example an externally-connected HDD or MO drive.

The printing service server 101 according to the present embodiment is capable of providing a printing service using the printer 215 that is connected to the IOC 214, but in general, printing output from a printing service uses a printer connected to the LAN 207.

<Configuration of Order Information Templat>

Figures 1, 5:
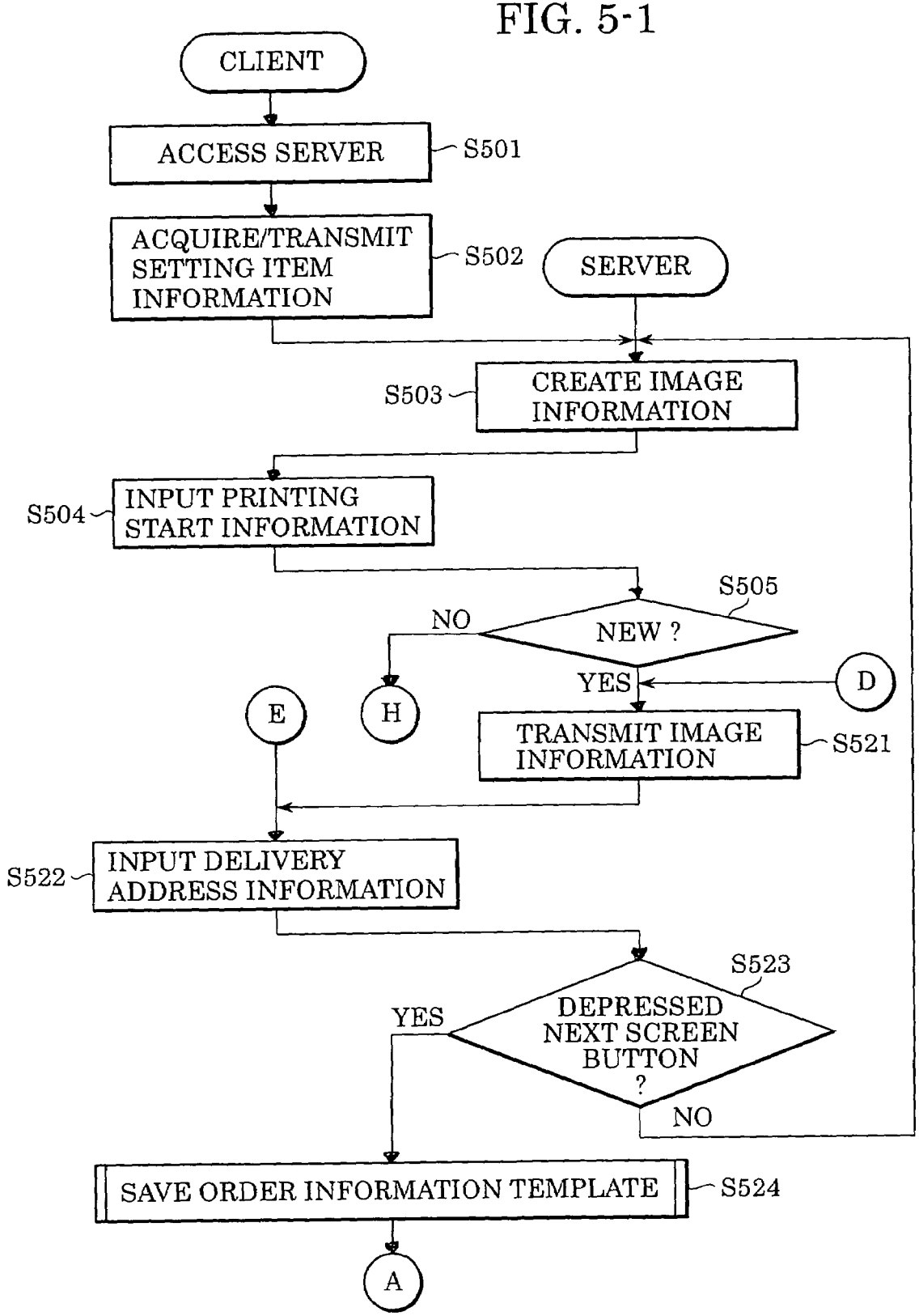
FIG. 5 is a flowchart illustrating the procedures of a document printing order process according to the present invention.
Figures 2, 5:
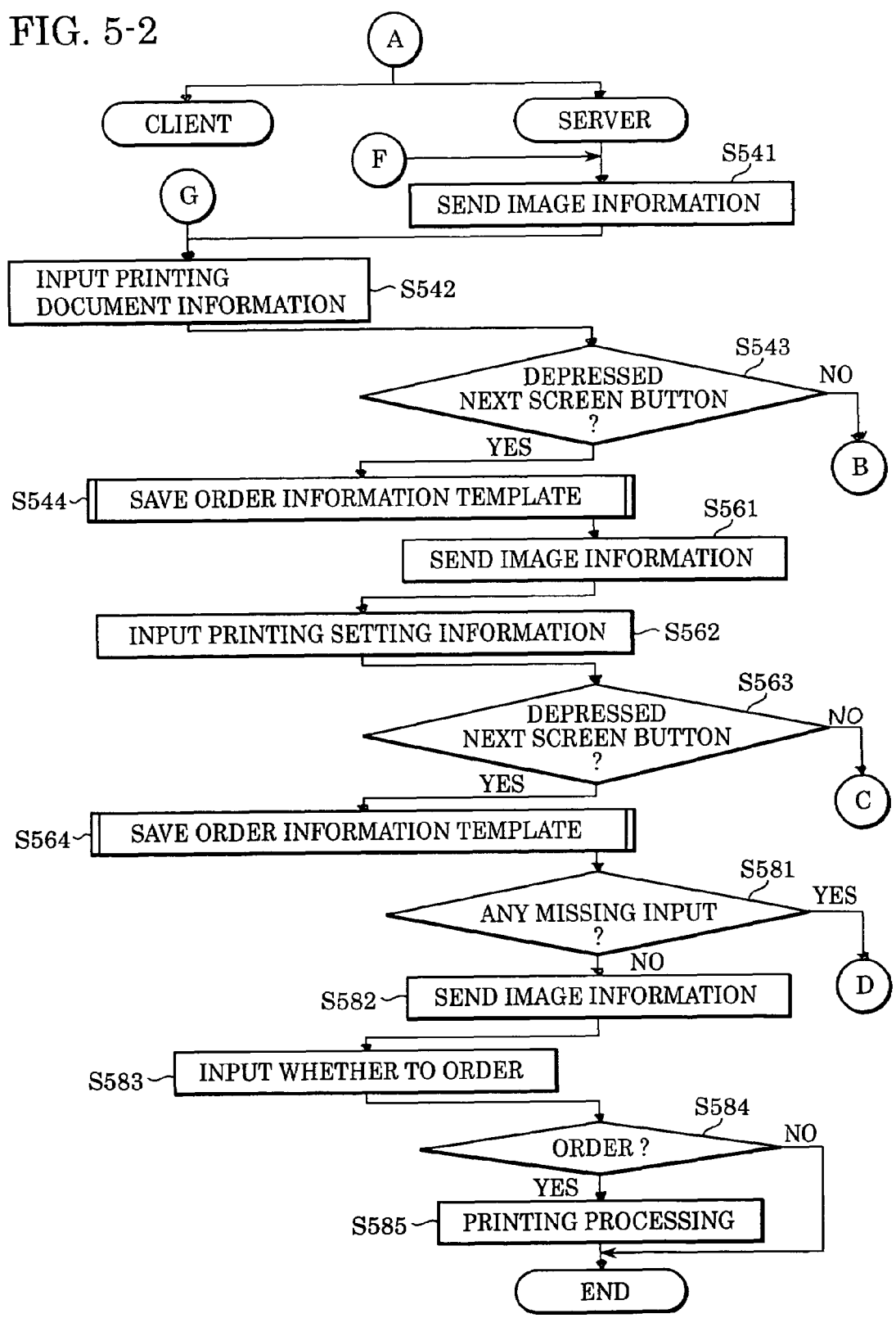
Figures 3, 5:
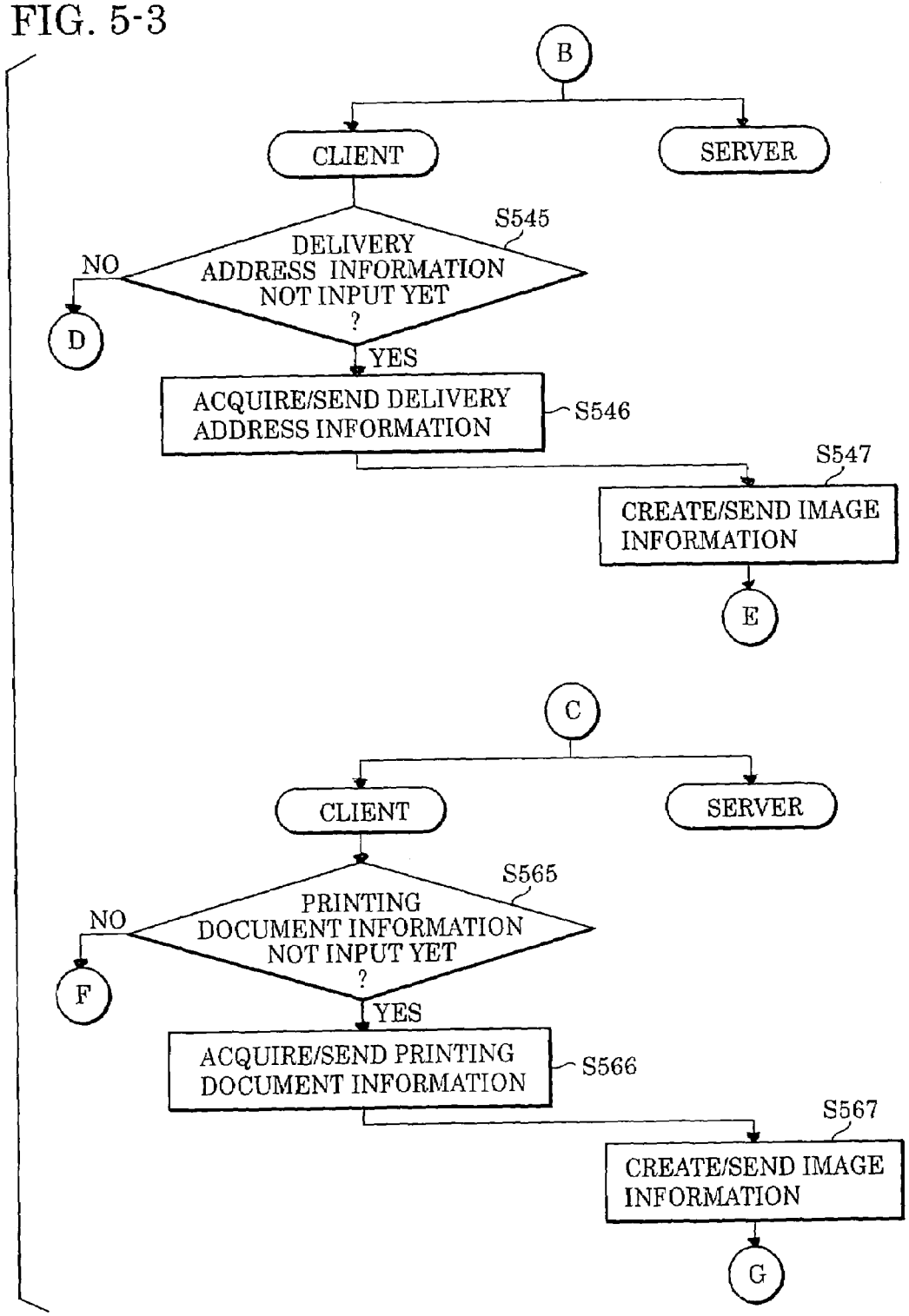
FIG. 3 is a diagram illustrating the configuration of an order information template according to the present invention.

One example of the order information template that is managed by the order information template managing unit 115 of the client 120 and saved in the order information template memory unit 117, is illustrated in FIG. 3.

According to the present embodiment, the order information template comprises a delivery address database 301, a printing setting information database 302, and a printing document information database 303.

The delivery address information database 301 has records that store the content of the delivery address item. The delivery address item includes a delivery address information ID 305, a delivery method 306, an addressee 307 and an address 308.

The printing setting information database 302 has records that store the content of the printing setting item. The printing setting item includes a printing setting information ID 309, a number of copies to be printed 310, a differentiation whether or not to perform color printing 311, a printing sheet size 312, a printing sheet type 313, a differentiation whether or not to perform two-sided printing, and a finishing method 315 for when the printing is ended. Further, for the differentiation whether or not to perform color printing 311 and the differentiation whether or not to perform two-sided printing, a "1" is stored in the event that the processing (color printing or two-sided printing) is to be performed, and a "0" is stored in the event that the processing is not to be performed.

The printing document information database 303 has records that store the content of the printing document item. The printing document item includes a printing document information ID 316, a document file name 317, and a path 318 that indicates the location wherein the document file is stored within the print service server 101.

Now, with the present embodiment, the three types of printing setting information of delivery address information, printing document information, and printing setting information have been given as order information to be included in the order information template, but do not need to be limited to these, and may include much more information, and databases thereof may be provided.

Further, within each database of the above-described order information, areas may be provided to store further content. For example, a region for information relating to a business area of a delivery address may be provided to the delivery address information database 301, or a region for information relating to the details of cover types or finishing may be provided to the printing setting information database 302.

Further, the present embodiment has been described as the records of each order information database being stored in a storage device in a database form, but does not need to be limited to this, and may be stored in a storage device in a file form.

<Configuration of Setting Item Information>

FIG. 4 illustrates one example of the setting item information that is managed by the setting item information managing unit 116 of the client 120 and saved in the setting item information memory unit 118.

According to the present embodiment, a setting item information database 404 has records storing IDs for specifying various types of order information of the order information template. The setting item information database 404 includes a setting item information ID 419, a setting item information version ID 420, a setting item information name 421, a delivery address information ID 422, a printing setting information ID 423, and a printing document information ID 424.

Further, the delivery address information ID 422, the printing setting information ID 423, and the printing document information ID 424 of the setting item information database 404 correspond respectively to the delivery address information ID 305 of the delivery address information database 301, the printing setting information ID 309 of the printing setting information database 302, and the printing document information ID 316 of the printing document information database 303.

Now, in the event that "0000" is stored in the delivery address information ID 422, the printing setting information ID 423, and the printing document information ID 424 of the setting item information database 404, this indicates that order information is not yet input. For example, in FIG. 4, the order information template wherein the setting item information ID 419 is "0002" shows the delivery address information ID 422 value as "0000", and therefore the delivery address information has not yet been input.

<Document Printing Order Processing>

The procedure wherein the user starts the browser of the client 120, accesses the printing service server 101, and makes a document printing order will be described with reference to FIG. 5.

Hereafter, the processing of the printing service server 101 and the client 120 is executed by the CPU 201 of the computer device comprising each. Further, the user uses the keyboard 211 or the pointing device 212 for the operation of inputting information into various screens displayed on the browser of the client 120.

First, in step S501, the client 120 starts the browser, inputs the URL of the printing service server 101, and accesses the printing service server 101.

In step S502, the setting item information managing unit 116 of the client 120 retrieves all records possessed by a setting item information database 504 from the setting item information memory unit 118. The retrieved setting item information is then sent to the printing service server 101 using the communication unit 113.

In step S503, the printing service server 101 acquires the setting item information name 421 from each record included in the setting item information received from the transmitting unit 131 of the client 120. According to the present example, "printer manual order" and "fliers" are acquired as setting item information names. Then the printing service server 101 creates screen information for displaying a printing order start screen 1101 as illustrated in FIG. 11, and sends this to the client 120.

The printing order start screen 1101 in FIG. 11 displays a new check box 1102, a setting information list box 1103, a setting information use check box 1105, and a next screen advance button 1104.

The setting item information name 421 acquired from the client 120 is displayed in the setting information list box 1103. FIG. 11 illustrates the "printer manual order" and the "fliers". Now, according to the present embodiment, the setting information list box 1103 is displayed within the printing order start screen 1101, but the setting information list box 1103 may be displayed on a screen other than the printing order start screen 1101.

"On" can be input into only one or the other of the new check box 1102 or the setting information use check box 1105. The user inputs "on" into either the new check box 1102 or the setting information use check box 1105 to specify whether a new printing order is to be performed, or whether an order is to be performed using the order information that has partially been entered previously. Further, if "on" is input into the setting information use check box 1105, input to the setting information list box 1103 is enabled. The next screen advance button 1104 is a button to be depressed at the time the user has ended the input into the printing order start screen 1101 and requests display of the next item input screen.

In step S504, the client 120 displays the printing order start screen 1101 on a browser, based on the screen information received from the printing service server 101. The user inputs the information for each item according to the printing order start screen 1101 displayed on the browser. Then when the next screen advance button 1104 depressing operation is input, the client 120 sends the values input into the new check box 1102, the use setting information check box 1105, and the setting information list box 1103 to the printing service server 101.

In step S505, the printing service server 101 determines whether or not the value of the new check box 1102 received from the client 120 is "on". In the event that the value of the new check box 1102 is determined to be "on" in step S505, the printing service server 101 sends the screen information for displaying the delivery address item input screen 1201 to the client 120 in step S521.

The delivery address item input screen 1201 in FIG. 12 displays a delivery method check box 1202, a delivery address name input box 1203, a delivery address input box 1204, a previous screen advance button 1205, and a next screen advance button 1206. Further, input boxes for inputting a delivery address postal code or a delivery address telephone number, or a cancel button may also be displayed. The delivery method check box 1202 is a check box for selecting the method of delivery of the printed materials. In FIG. 12, the option of postal mail or express delivery may be selected. The name of the addressee to whom the printed materials are to be delivered is input into the delivery address name input box 1203. The address to which the printed materials are to be delivered is input into the delivery address input box 1204. The previous screen advance button 1205 is a button for requesting the screen displayed prior to the delivery address item input screen 1201 from the printing service server 101, which according to the present embodiment is the screen information for displaying the printing order start screen 1201. The next screen advance button 1206 is a button for requesting the screen displayed following the delivery address item input screen 1201 from the printing service server 101, which according to the present embodiment is the screen information for displaying the printing document item input screen 1401.

In step S522, the client 120 displays the delivery address item input screen 1201 on the browser, based on the screen information sent in step S521. The user then inputs the information into each item, according to the delivery address item input screen 1201. According to the operation of the user, when the client 120 inputs the depressing operation for either the previous screen advance button 1205 or the previous screen advance button 1206, the delivery address information including the values input in the delivery method check box 1202, the delivery address name input box 1203, and the delivery address input box 1204 is sent to the printing service server 101. For example, for the delivery address information input screen 1201 of FIG. 12, the delivery address information including the values of "postal mail" for the delivery method check box 1202, "CANON" for the delivery address name input box 1203, and "3-30-2, SHIMOMARUKO, OHTA-KU, TOKYO" for the delivery address input box 1204 are sent.

In step S523, the printing service server 101 determines whether or not the depressing operation has been input for the next screen advance button 1206.

Figure 6:
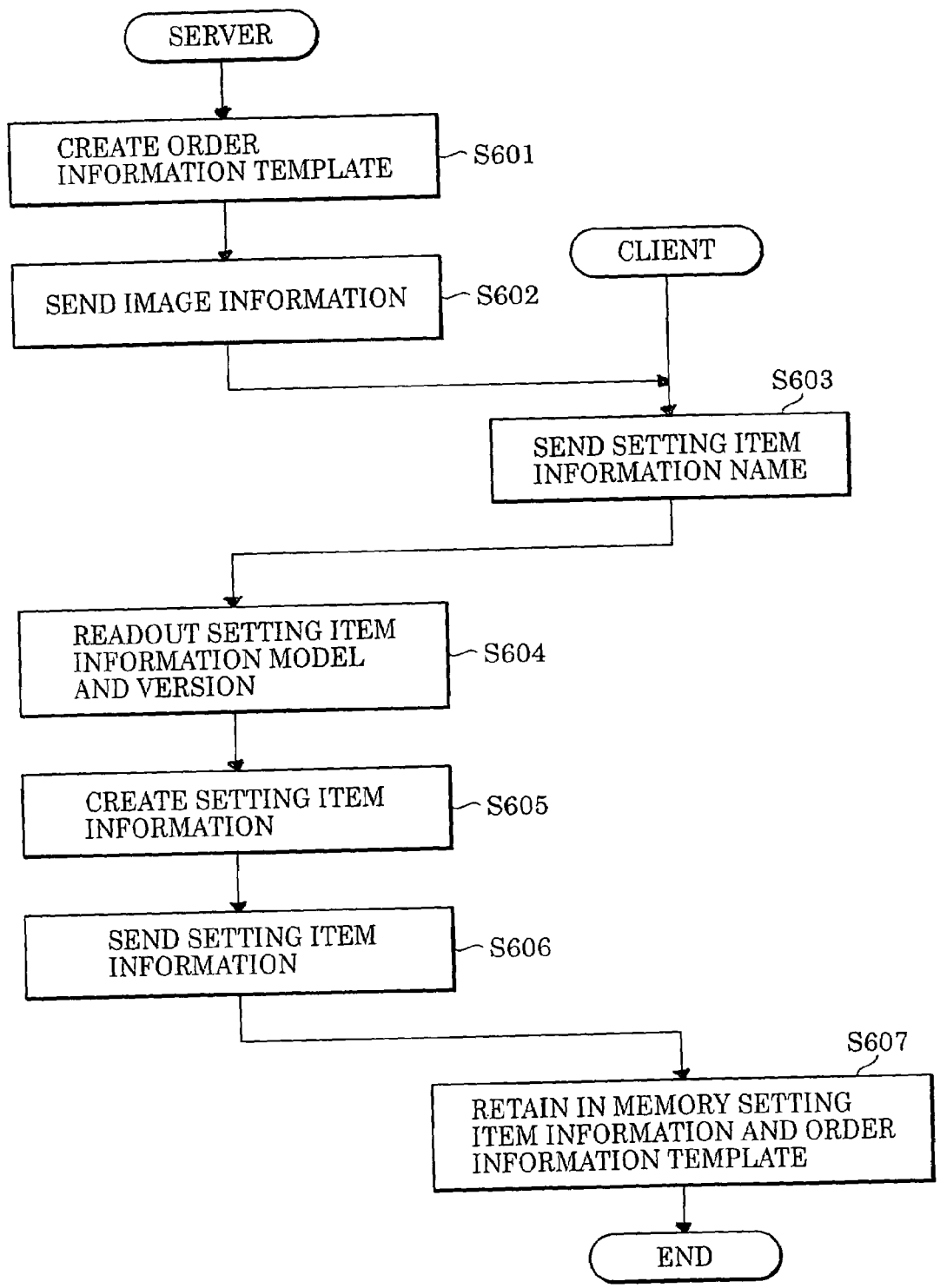
FIG. 6 is a flowchart illustrating the procedures of an order information template saving process according to the present invention.

In the event that determination is made in step S523 that the depressing operation has been input for the next screen advance button 1206, in step S524 the printing service server 101 and the client 120 execute the order information template saving process illustrated in FIG. 6.

Now, in the event that determination is made in step S523 that the depressing operation has been input for the previous screen advance button 1207 and not for the next screen advance button 1206, the process is executed for step S503 and thereafter.

Next, the order information template saving process that is executed by the printing service server 101 and the client 120 in step S524 will be described with reference to FIG. 6.

In step S601, the printing service server 101 reads out the order information template model from the order information template model memory unit 104, using the order information template model managing unit 108, and inputs the delivery address information sent in step S522 into the order information template model. Further, a delivery address information ID is issued and input into this order information template model, and the order information template is created.

In step S602, the printing service server 101 sends the screen information for displaying the setting item information name input screen 1301 illustrated in FIG. 13 on the browser of the client 120 to the client 120.

The setting item information input screen 1301 in FIG. 13 displays a setting item information input box 1302, an OK button 1303, and a cancel button 1304. The setting item information name is input into the setting item information name input box 1302. The OK button 1303 is a button for requesting the screen information from the printing service server 101 for displaying the screen to perform the next process after the user has ended input into the setting item information name input screen 1301. The cancel button 1304 is a button for the user to specify stopping the input into the setting item information name input screen 1301. The setting item information name input screen 1301 in FIG. 13 provides a cancel button 1304, but this is not indispensable.

In step S603, the client 120 displays the setting item information name input screen 1301 using the browser, based on the screen information sent from the printing service server 101 in step S602. The user inputs then the setting item information name into the setting item information name input box 1302 according to the setting item information name input screen 1301. Upon the depression operation of the OK button 1303 being input by the operation of the user, the setting item information name input into the setting item information name input screen 1301 is sent to the printing service server 101.

In step 604, the printing service server 101 reads out the setting item information model and the version ID thereof from the setting item information model memory unit 105 by means of the setting item information model managing unit 109.

In step 605, the printing service server 101 issues a setting item information ID. The setting item information name, the version ID, the setting item information ID, and the delivery address information ID are input into the setting item information model, and the setting item information is then created. Now, according to the present embodiment, the information for the printing document item or the printing setting item has not yet been input, and therefore the initial value of the printing document information ID and the printing setting information ID is input as "0000".

In step 606, the printing service server 101 sends the order template and the setting item information to the client 120.

In step 607, the client 120 creates a new record in the setting item information database 504 of the setting item information memory unit 118 by means of the setting item information managing unit 116, and stores the setting item information. Further, a new record is created in the delivery address information database 301 of the order information template memory unit 117 by means of the order information template managing unit 115, and this stores the order information template.

Next, upon the order information template saving process in step S524 ending, the printing service server 101 sends the screen information for the purposes of displaying the printing document item input screen 1401 as illustrated in FIG. 14 to the client 120 in step S541.

The printing document item input screen 1401 in FIG. 14 displays a file path input box 1402, a file name input box 1403, a previous screen advance button 1404, and a next screen advance button 1405. Further, a file type or a cancel button may also be displayed. The file path input box 1402 inputs the path on the HDD 213 of the printing service server 101 where the document file which is to be the object of the printing order is stored. The file name input box 1403 inputs the file name of the document file to be the object of the printing order. The previous screen advance button 1404 is a button for specifying the display of the screen displayed previous to the printing document item input screen 1401, which according to the present embodiment is the display of the delivery address item input screen 1201. The next screen advance button 1405 is a button for the purpose for specifying that the input into the item displayed in the printing document item input screen 1401 is ended, and that the next screen, which according to the present embodiment is the printing setting item input screen 1501 as illustrated in FIG. 15, is to be displayed.

In step S542, the client 120 displays the printing document item input screen 1401 on the browser, based on the screen information sent in step S541. The user then inputs the information for each item according to the printing document item input screen 1401. Upon the client 120 inputting the depression operation of either of the previous screen advance button 1404 or the next screen advance button 1405 by the operation of the user, the values input into the file path input box 1402 and the file name input box 1403 are sent to the printing service server 101 via the communication unit 113.

In step S543, the printing service server 101 determines whether or not the depression operation of the next screen advance button 1405 has been input at the client 120.

Figure 7:
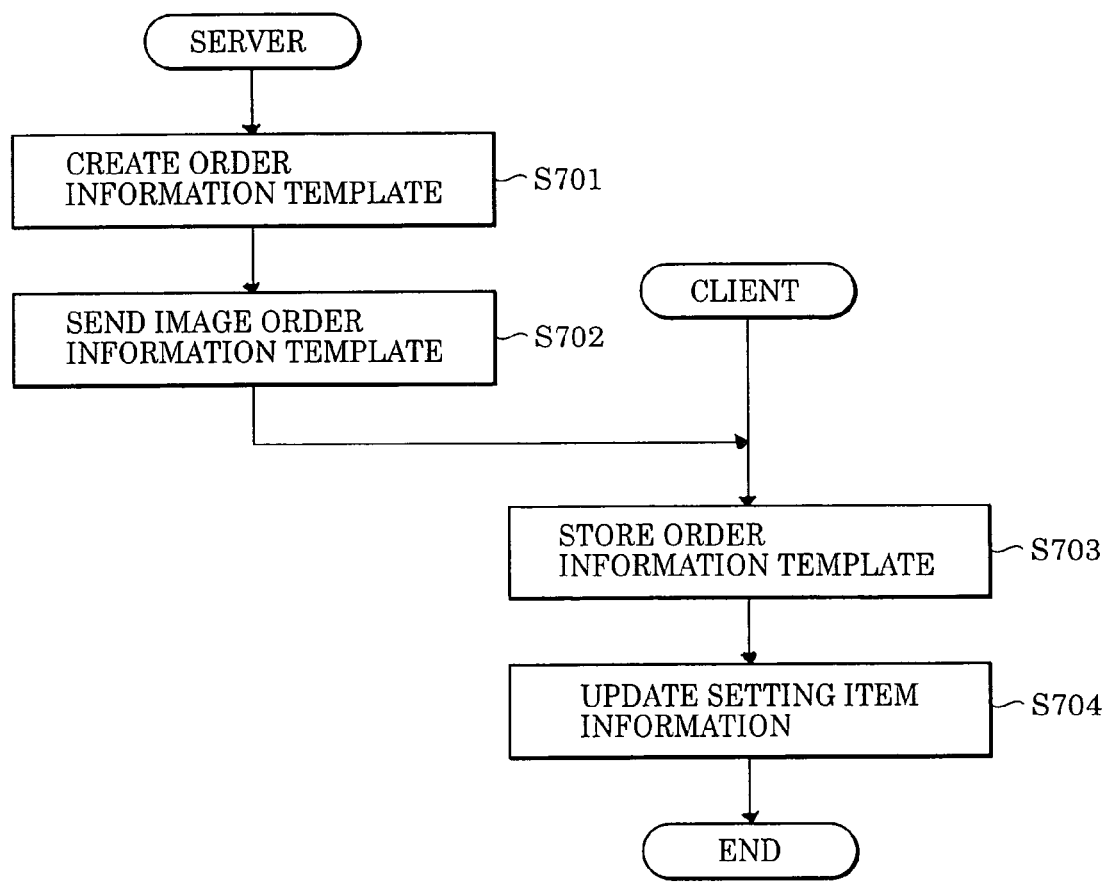
FIG. 7 is a flowchart illustrating the procedures of an order information template saving process according to the present invention.

In the event that the depression operation of the next screen advance button 1405 is determined to have been input in step S543, the printing service server 101 and the client 120 perform the order information template saving process as illustrated in FIG. 7 in step S544.

Now, in the event that the depression operation in step S543 is determined to have been input for the previous screen advance button 1404 and not for the next screen advance button 1405, the client 120 determines in step S545 whether the deliver address information ID 422 of the setting item information database 404 is "0000".

In the event that determination is made in step S545 that "0000" is not the case, the client 120 reads out the delivery address information corresponding to the delivery address information ID 422 from the delivery address information database 301, and sends this to the printing service server 101 in step S546. In step S547, the printing service server 101 sends the screen information for displaying the delivery address item input screen 1201 that displays the content of the delivery address information sent from the client 120 in step S546 to the client 120. The processing is then executed for step S522 and thereafter.

On the other hand, in the event that determination is made in step S545 that "0000" is the case, the processing is executed for step S521 and thereafter.

Below, the order information template saving process executed by the printing service server 101 and the client 120 in step S544 will be described with reference to FIG. 7.

In step S701, the printing service server 101 reads out the order template model from the order information template model memory unit 104, and inputs the printing document information sent in step S542. Further, the printing document information ID is issued, and input into this order information template model, and an order information template is created.

In step S702, the printing service server 101 sends the order information template created in step S701 to the client 120.

In step S703, the client 120 creates a new record in the printing document information database 303 of the order information template memory unit 117 by means of the order information template managing unit 116, and stores the order information template sent in step S702.

In step S704, the client 120 reads out the setting item information from the setting item information memory unit 118, and updates this using the printing document information ID included in the order information template sent in step S702.

When the order information template saving processing in step S544 is ended, the printing service server 101 sends the screen information for displaying the printing setting item input screen 1501 to the client 120 in step S561.

The printing setting item input screen 1501 in FIG. 15 displays a number of printing copies input box 1502, a color/BW printing selection check box 1503, a finishing division selection check box 1504, a finishing size selection check box 1505, a printing sheet selection check box 1506, a previous screen advance button 1507, and a next screen advance button 1508. Further, a check box for inputting details such as cover types and finishing or a cancel button may also be displayed. The number of document copies to be printed is input into the number of printing copies input box 1502. The color/BW printing selection check box 1503 is a check box for selecting and inputting whether the document is to be printed in color or in black and white. The finishing division selection check box 1504 is a check box for selecting and inputting whether the document is to be printed two-sided or one-sided. The finishing size selection check box 1505 is a check box for selecting and inputting the size of the paper on which the document is to be printed. The printing sheet selection check box 1506 is a check box for selecting an inputting the type of paper on which the document is to be printed. The previous screen advance button 1507 is a button for specifying the display of the screen displayed previous to the printing setting item input screen 1501, which according to the present embodiment is the display of the printing document item input screen 1401. The next screen advance button 1508 is a button to notify the printing service server 101 that the input of the printing setting item input screen 1501 has been ended.

In step S562, the client 120 displays the printing setting item input screen 1501 on the browser, based on the screen information sent in step S561. The user then inputs the information into each item, according to the printing setting item input screen 1501. When the client 120 inputs the depression operation of either of the previous screen advance button 1507 or the next screen advance button 1508 by the operation of the user, the printing setting information including the values input into the number of printing copies input box 1502, the color/BW printing selection check box 1503, the finishing division selection check box 1504, the finishing size selection check box 1505, and the printing sheet selection check box 1506 is sent to the printing service server 101. For example, in the case of the printing setting item input screen 1501 in FIG. 15, the printing setting information including the values of "10 copies" for number of printing copies 1502, "0" for color printing selection, "1" for two-sided printing selection, "A4" for printing sheet size, and "plain paper" for printing sheets is sent. Further, the client 120 reads out the setting item information from the setting item information memory unit 118, by means of the setting information managing unit 116, and sends this to the printing service server 101 using the communication unit 113.

In step S563, the printing service server 101 determines whether or not the depression operation of the next screen advance button 1508 has been input in the client 120.

Figure 8:
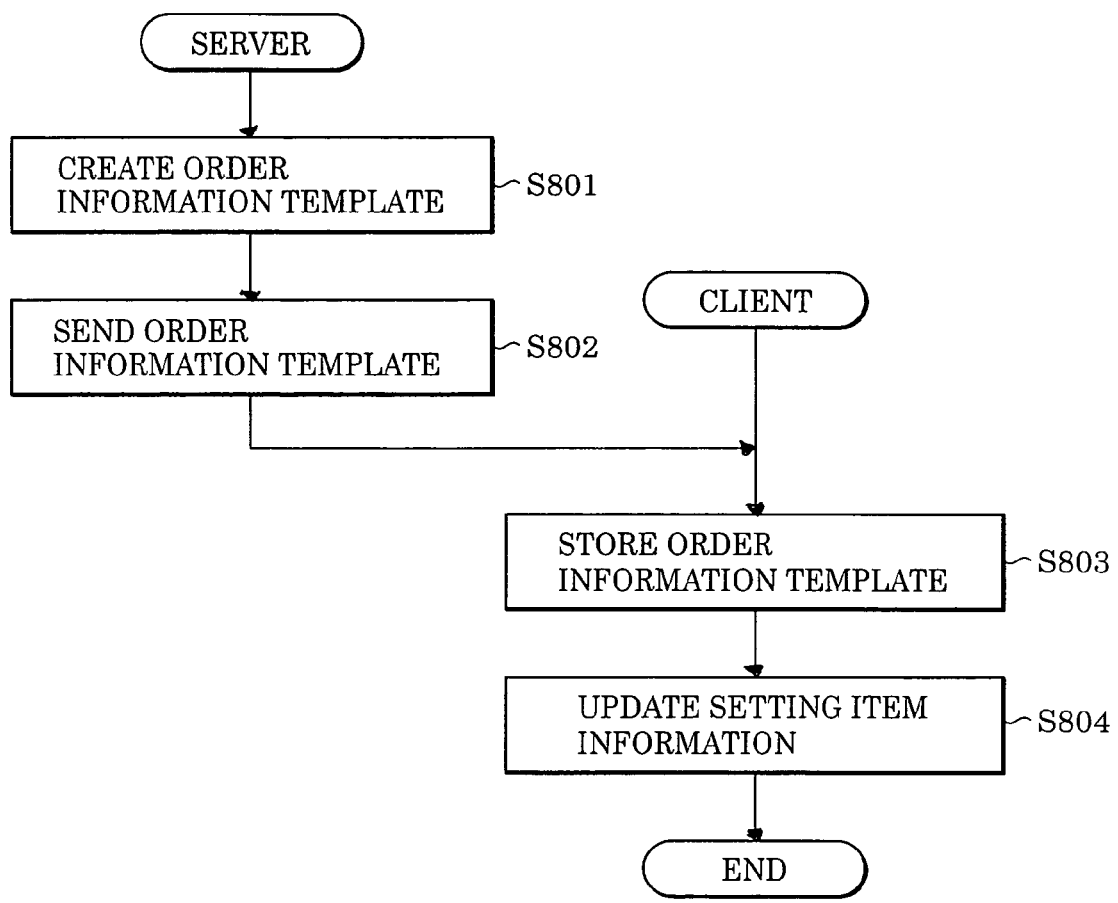
FIG. 8 is a flowchart illustrating the procedures of an order information template saving process according to the present invention.

If the depression operation of the next screen advance button 1508 is determined to have been input in step S563, the printing service server 101 and the client 120 perform the order information template saving process as illustrated in FIG. 8 in step S564.

Now, if the depression operation in step S563 is determined to have been input for the previous screen advance button 1507 and not for the next screen advance button 1508, the client 120 determines in step S565 whether the printing document information ID 424 of the setting item information database 404 is "0000".

In the event that determination is made in step S565 that "0000" is not the case, the client 120 reads out the printing document information corresponding to the printing document information ID 424 from the printing document information database 301, and sends this to the printing service server 101 in step S566. In step S567, the printing service server 101 sends the screen information for displaying the printing document item input screen 1401 that displays the content of the printing document information sent from the client 120 in step S566 to the client 120. Then the processing is executed for step S542 and thereafter.

On the other hand, in the event that determination is made in step S565 that "0000" is the case, the processing is executed for step S541 and thereafter.

Below, the order information template saving process executed by the printing service server 101 and the client 120 in step S564 will be described with reference to FIG. 8.

In step S801, the printing service server 101 reads out the order template model from the order information template model memory unit 104, and inputs the printing setting information sent in step S562. Further, the printing setting information ID is issued, and input into the order information template model, and an order information template is created.

In step S802, the printing service server 101 sends the order information template created in step S801 to the client 120.

In step S803, the client 120 creates a new record in the printing setting information database 302 of the order information template memory unit 117 by means of the order information template managing unit 116, and stores the order information template sent in step S802.

In step S804, the client 120 reads out the setting item information from the setting item information memory unit 118, and updates this using the printing setting information ID included in the order information template sent in step S802 by means of the order information template managing unit 116.

Upon the order information template saving processing in step S564 ending, the client 120 sends the setting item information to the printing service server 101. In step S581, the printing service server 101 determines whether or not any order information ID is "0000".

In the event that none of the setting item information are determined to show "0000" for an order information ID in step S581, the printing service server 101 in step S582 considers all necessary information to be input for the printing order, starts the printing process, and sends the screen information for displaying the order content confirmation screen for the user to confirm the content of the order information to the client 120. On the other hand, in the event that determination is made in step S581 that "0000" is the case, the processing is executed for step S521 and thereafter.

In step S583, the client 120 displays the order content confirmation screen on the browser according to the screen information send in step S582. The client 120 then sends to the printing server 101 whether or not the displayed order content has been agreed to.

In step S584, the printing service server 101 determines whether or not the agreement has been sent in step S583.

In the event that determination is made in step S584 that the agreement has been sent, the printing server 101 performs the document printing process in step S585, according to the order information. Specifically, first, the printing server 101 requests from the client 120 and acquires the order information template that corresponds to the order information ID of the setting item information. Next, the document specified from the printing document of the order information template is acquired from the HDD 213 of the printing service server 101, and is printed using a PRT 215 according to the printing setting information of the order information template. Then, the operator is notified by displaying the delivery address information of the order information template on the CRT 209 of the printing service server 101 or printing a delivery label using the PRT 215 of the printing service server 101, and instructions are given to deliver the printed materials.

Now, in addition to the above described order information input screens, a payment item input screen for inputting information necessary for payment of the document printing fees may be added and displayed.

Further, prior to the saving process of each order information template, the printing service server 101 can check whether or not any incorrect values are included in the values of the order information from the client 120, and if the values are correct, perform the saving process of each order information template.

As described above, the items of the order information are divided and input into several screens, and the input information is automatically saved to the client each time the input screen changes.

By doing so, even in the event that the user disconnects the input of the order information, the order information input prior to that time is saved, and so in the case that the user re-inputs the order information the next time, this can be read out and used.

Re-Inputting Order Information for Document Printing

According to the present embodiment, in the case wherein the user re-inputs information that was lacking from the order information that had previously been partially input and places a printing order, the value of "on" is input into the setting information use check box 1105 of the order start screen 1101.

Figure 9:
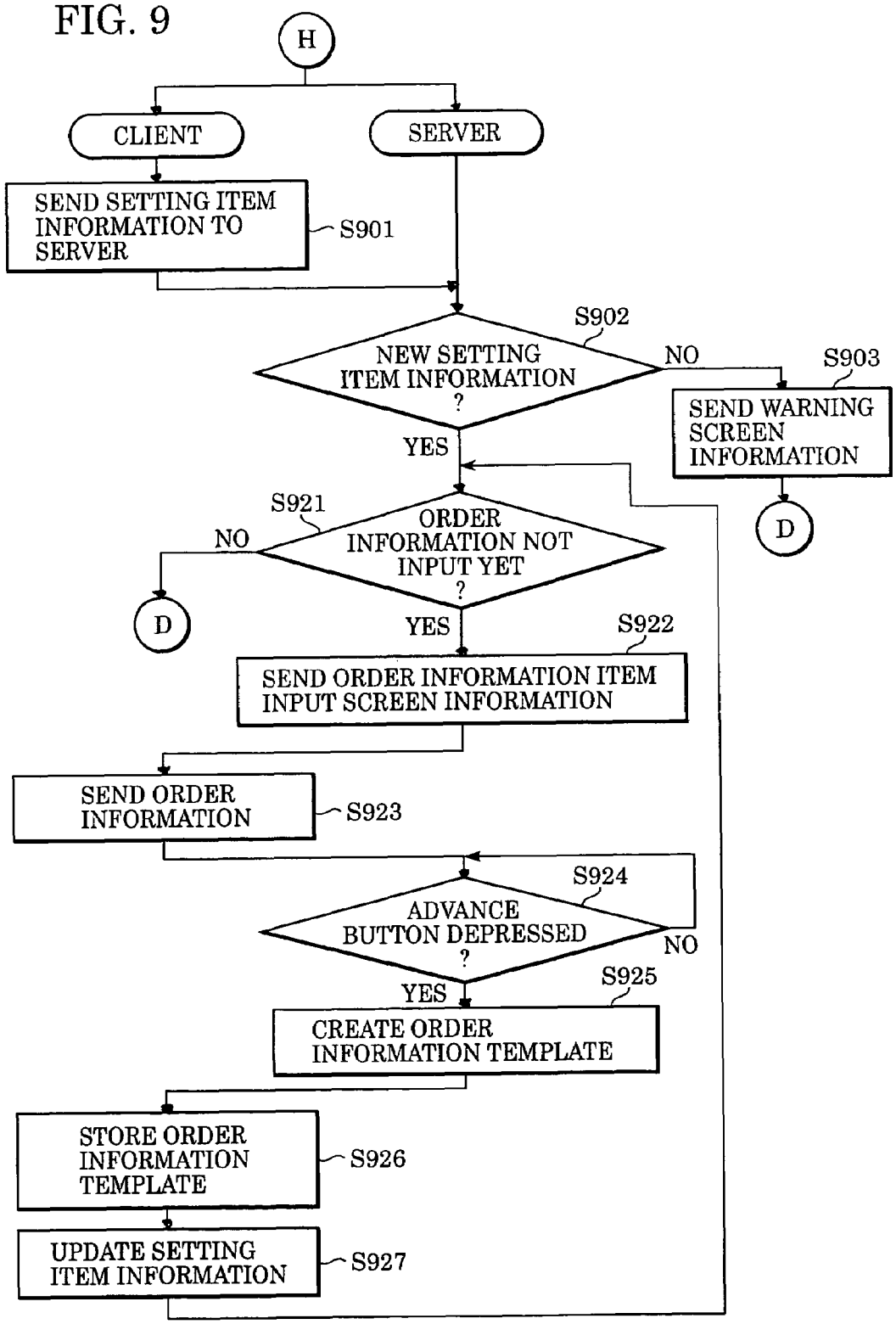
FIG. 9 is a flowchart illustrating the procedures for a re-input process of the document printing order according to the present invention.

A case of processing wherein the value of the new check box 1102 is not determined to be "on", and the value of the setting information use check box 1105 is determined to be "on" in step S505, will be described now with reference to FIG. 9.

In step S901, the client 120 acquires the setting item information corresponding to the setting item information name stored in the setting item information list box 1103 from the printing setting item information database 404 of the setting item information memory unit 118 by means of the setting item information managing unit 116, and sends this to the printing service server 101. According to the present example, "order fliers" is selected in the setting item information list box 1103, and the record of the setting item information ID "0002" of the setting item information database 404 illustrated in FIG. 4 is explained as having acquired as the setting item information.

In step 902, the printing service server 101 determines whether or not the setting item information sent during S902 is old, by comparing the value of the newest version of the setting item information managed by the setting item information model managing unit 109 and the value of the version ID 420 included in the setting item information sent in step S901.

Figure 10:
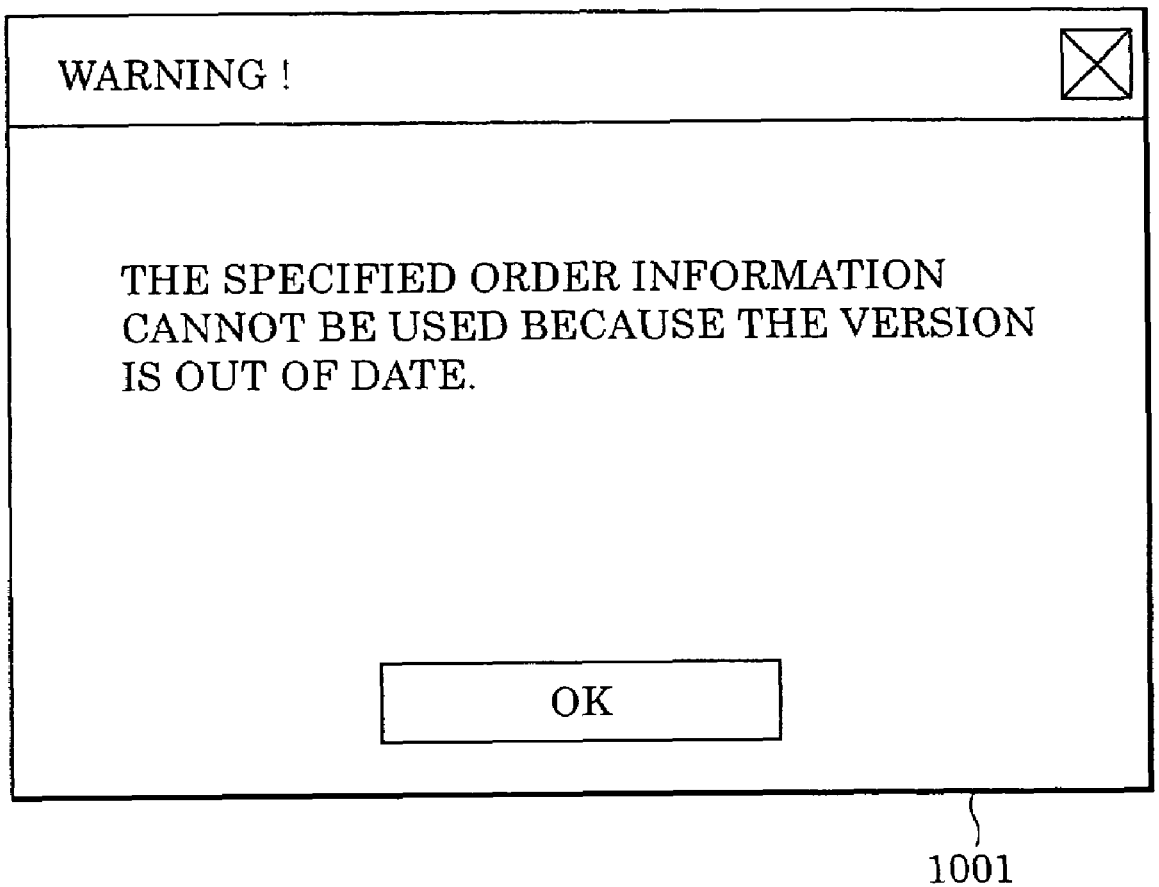
FIG. 10 is a diagram illustrating a warning screen according to the present invention.

In the event that determination is made in step S902 that the information is old, the printing service server 105 creates screen information for displaying a warning screen 1001 as illustrated in FIG. 10 to specify that the previously input order information cannot be used, and sends this to the client 120 in step S903. The client 120 receives and analyzes the screen information sent in step S903, and displays this on the browser of the client 120 by means of the display unit 114. Doing so enables communication to the user that the setting item information currently stored in the client 120 cannot be used because it is out of date. Then the processing is executed for step S521 of FIG. 5 and thereafter in order.

In the event that determination is not made in step S902 that the information is old, the printing service server 101 determines whether any order information ID is "0000" in the setting item information in step S921.

In the event that determination is made in step S921 that there is "0000" for an order information ID, the printing service server 101 sends a screen information for displaying the order information input screen of that item to the client 120 in step 922. According to the present example, since "0000" is stored in the delivery address information ID, the delivery address information is determined to not yet be input, and screen information for displaying the delivery address item input screen 1201 is sent.

In step S923, the client 120 displays the delivery address item input screen 1201 on the browser, according to the screen information sent in step S922. Then the delivery address information is input. When the client 120 inputs the depression operation of either of the previous screen advance button 1507 or the next screen advance button 1508 by the operation of the user, the delivery address information including the values input into the delivery method selection check box 1202, the delivery address name input box 1203, and the delivery address input box 1204 is sent to the printing service server 101.

In step 924, the printing service server 101 determines whether or not the depression operation of the next screen advance button 1206 has been input at the client 120.

If the depression operation is determined to have been input in step S924, the flow proceeds to step S925. Otherwise, the flow loops back to step S924, i.e., to a standby state awaiting the depression operation. In step S925, the printing service server 101 reads out the order information template model from the order information template model memory unit 104 by means of the order information template model managing unit 108 in step S925, and inputs the delivery address information sent in step S923. Further, a delivery address information ID is issued and input into this order information template model, and the order information template is created and sent.

In step S926, the client 120 creates a new record in the delivery address information database 301 of the order information template memory unit 177 by means of the order information template managing unit 116, and stores the order information template sent in step S925.

In step S927, the client 120 reads out the setting item information from the setting item information memory unit 118, and updates the delivery address information ID included in the order information template sent in step S925.

Then in the event that step S921 finds no "0000" in the order information ID, the printing processing is executed for step S521 and thereafter.

Now, in step S503, the printing service server 101 may compare the version ID of the setting item information from the client 120 and the newest version ID of the setting item information from the setting item information model managing unit 109, and the setting item information name of the setting item information, wherein the setting item information version from the client 120 is determined to be old, can be set to not display on the printing order start screen 1201.

Further, although the present embodiment has been described such that in the event that determination is made in step S903 that the setting item information is old, the previously input order information cannot be used, and the order information is input once again from the start; however, in the event that some order information is the same as the setting item information of the new version, that order information can be reused, and the input of that order information can be omitted. Then an order information item input screen for inputting the order information added on from the setting item information from the new version can be displayed to the client and have the user input.

Further, regarding the re-inputting of order information for the document printing, the case wherein the depression operation of the next screen advance button is input has been described, but the same applies to the depression operation of all screen advance buttons.

As described above, the user can use the previously input order information, and therefore the user can continue re-inputting from where the order information left off. Further, because the order information of previously executed printing processing is also saved, one portion of the conditions of that order information can be re-input.

Now, it goes without saying that the object of the present invention can be achieved also by a storage medium (or a recording medium) that has stored the software program realizing the functions of the above-described embodiment provided on a system or a device, with the computer (or CPU or MPU) of that system or device being able to read out the program code stored in the storage medium. In this case, the program code itself that is read out from the storage medium executes the function of the above-described embodiment, and the storage medium that stores that program code comprises the present invention. Further, by executing the program code read out by the computer, not only is the function of the above-described embodiment executed, but it goes without saying that this encompasses cases wherein, the operating system running on the computer performs part or all of the actual processing according to the instructions of that program code, whereby the function of the above-described embodiment is realized.

Further, after the program code read out from the storage medium is written into a function expansion card inserted into the computer or memory provided to a function expansion unit that is connected to the computer, it goes without saying that this encompasses cases wherein the CPU equipped with the function expansion card or the capability expansion unit performs part or all of the actual processing according to the instructions of that program code, whereby the function of the above-described embodiment is realized.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A print order system comprising:
a server device and a client device which are connected via a network so as to be capable of communicating with each other, the server receiving print orders from the client device,
wherein the server device comprises:
receiving means for receiving print order information at every setting item from the client device and writing the received setting item to memory;
order model managing means for managing the print order information as an order model at every setting item; and
sending means for sending the order model being managed by the order model managing means to the client device at every setting item of the print order information, and
wherein the client device comprises:
receiving means for receiving the order model received from the server device at every setting item of the print order information;
order model saving means for saving the order model received from the receiving means at every setting item of the print order information;
a web browser for displaying the print order information set in the order model stored by the order model saving means on a screen being switched depending on a type of the setting item;
print order information editing means for editing the print order information, at every setting item based on screen information by using the web browser; and
sending means for sending the order model of which the print order information is edited by the print order information editing means, to the server device,
wherein the order model saving means saves the order model, in which the edited print order information is set, after each completion of editing the print order information by the print order information editing means.

2. The print order system according to claim 1, wherein the type of the setting item includes at least one of destination information, print setting information and print document information.

3. An information processing apparatus connected to a server apparatus via a network so as to be capable of communicating with the server apparatus, for sending print orders to the server apparatus, the information processing apparatus comprising:
receiving means for receiving an order model from the server apparatus at every setting item of print order information;
order model saving means for saving the order model received from the receiving means at every setting item of the print order information;
a web browser for displaying the print order information set in the order model stored by the order model saving means, on a screen being switched depending on a type of the setting item;
print order information editing means for editing the print order information, at every setting item based on screen information, by using the web browser; and
sending means for sending the order model of which the print order information is edited by the print order information editing means, to the server apparatus,
wherein the order model saving means saves the order model, in which the edited print order information is set, after each completion of editing the print order information by the print order information editing means.

4. The information processing apparatus according to claim 3, wherein the type of the setting item includes at least one of destination information, print setting information and print document information.

5. A print order method comprising:
receiving, at a server, print order information at every setting item from a client device and writing the received setting item to memory;
managing, at the server, the print order information as an order model at every setting item;
sending, from the server to the client device, the order model being managed at every setting item of the print order information;
receiving, at the client device, the order model received from the server device at every setting item of the print order information;
saving, at the client device, the order model received at every setting item of the print order information;
displaying, via a web browser, the stored print order information set in the order model on a screen being switched depending on a type of the setting item;
editing, at the client device, the print order information, at every setting item based on screen information, by using the web browser; and
sending the order model of which the print order information is edited, to the server device,
wherein the order model in which the edited print information is set is saved after completion of each editing of the print order information.

6. The print order method according to claim 5, wherein the type of the setting item includes at least one of destination information, print setting information and print document information.

7. A method for receiving print orders at an information processing apparatus from a server apparatus connected to the information processing apparatus via a network, the method comprising:
receiving, from the server apparatus, an order model at every setting item of print order information;
saving the order model received at every setting item of the print order information;
displaying, via a web browser, the saved print order information set in the order model, on a screen being switched depending on a type of the setting item;
editing the print order information, via a web browser, set in the order model at every setting item saved based on screen information; and
sending the order model of which the print order information is edited, to the server apparatus, wherein the order model in which the edited print information is set is saved after completion of each editing of the print order information.

8. The method according to claim 7, wherein the type of the setting item includes at least one of destination information, print setting information and print document information.

9. A computer-readable storage medium for storing computer-executable instructions for causing a print order method to be performed, comprising:

receiving, at a server, print order information at every setting item from a client device and writing the received setting item to memory;

managing, at the server, the print order information as an order model at every setting item;

sending, from the server to the client device, the order model being managed at every setting item of the print order information;

receiving, at the client device, the order model received from the server device at every setting item of the print order information;

saving, at the client device, the order model received at every setting item of the print order information;

displaying, via a web browser, the stored print order information set in the order model on a screen being switched depending on a type of the setting item;

editing, at the client device, the print order information at every setting item based on screen information by using the web browser; and sending the order model of which the print order information is edited, to the server device, wherein the order model in which the edited print information is set is saved after completion of each editing of the print order information.

10. A computer-readable storage medium for storing computer-executable instructions for performing a method for receiving print orders at an information processing apparatus from a server apparatus connected to the information processing apparatus via a network, comprising:

receiving, from the server apparatus, an order model at every setting item of print order information;

saving the order model received at every setting item of the print order information;

displaying, via a web browser, the saved print order information set in the order model, on a screen being switched depending on a type of the setting item;

editing the print order information, via a web browser, set in the order model at every setting item saved based on screen information; and sending the order model of which the print order information is edited, to the server apparatus, wherein the order model in which the edited print information is set is saved after completion of each editing of the print order information.

* * * * *